Figure 2:
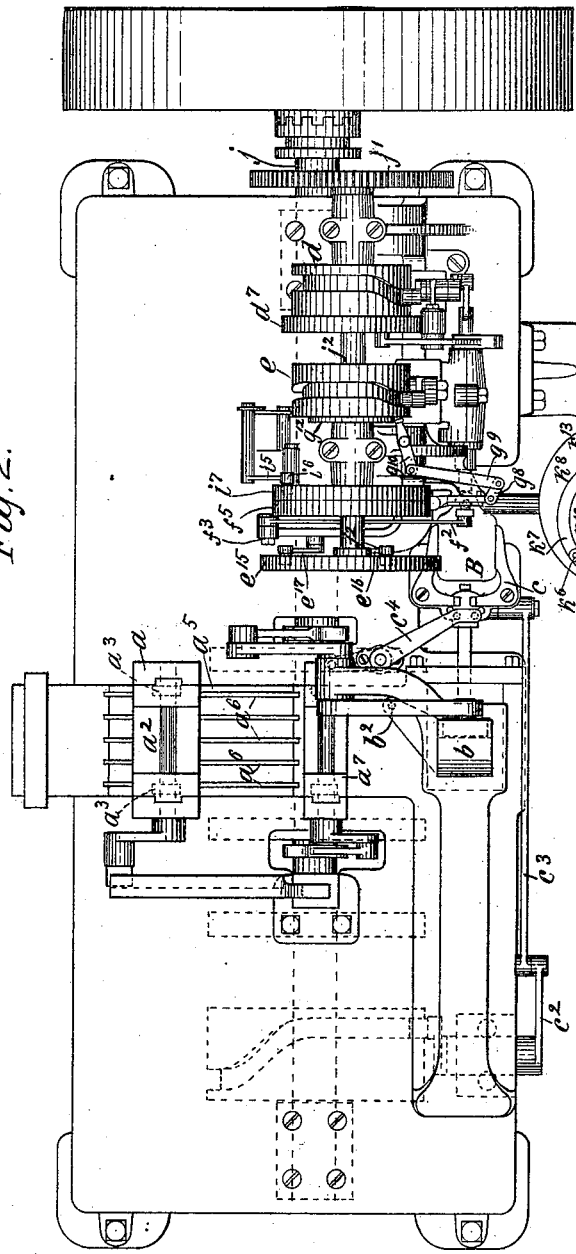

No. 645,567. Patented Mar. 20, 1900.
W. S. McKINNEY.
MACHINE FOR MAKING AND STRINGING TAGS.
(Application filed Apr. 7, 1899.)
(No Model.) 9 Sheets—Sheet 1.

Witnesses:
Charles H. Taylor
William M. Robertson

Inventor
Walter S. McKinney
By Roeder & Biesen
Attorneys

THE NORRIS PETERS CO., PHOTO-LITHO., WASHINGTON, D. C.

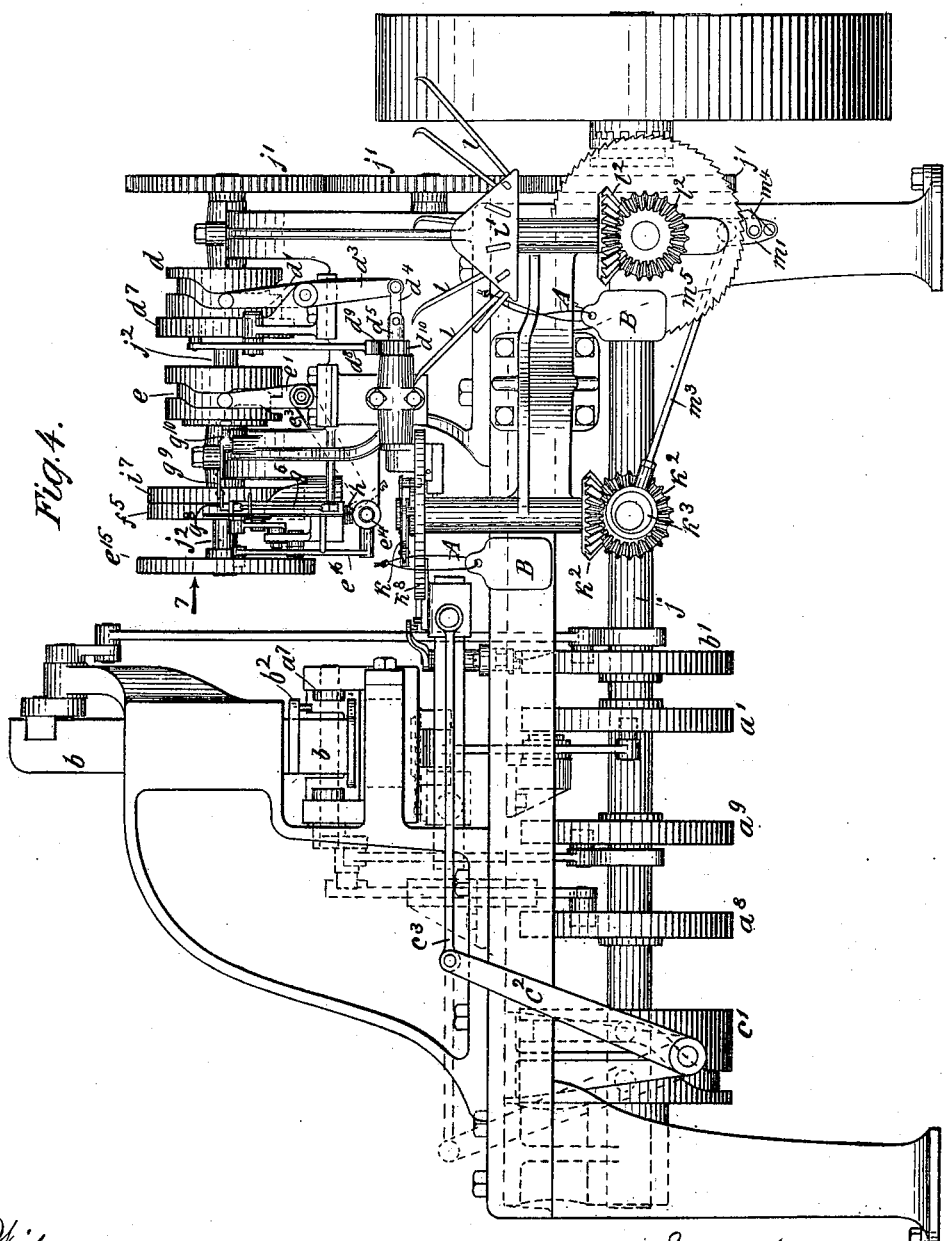

No. 645,567. Patented Mar. 20, 1900.
W. S. McKINNEY.
MACHINE FOR MAKING AND STRINGING TAGS.
(Application filed Apr. 7, 1899.)
(No Model.) 9 Sheets—Sheet 3.
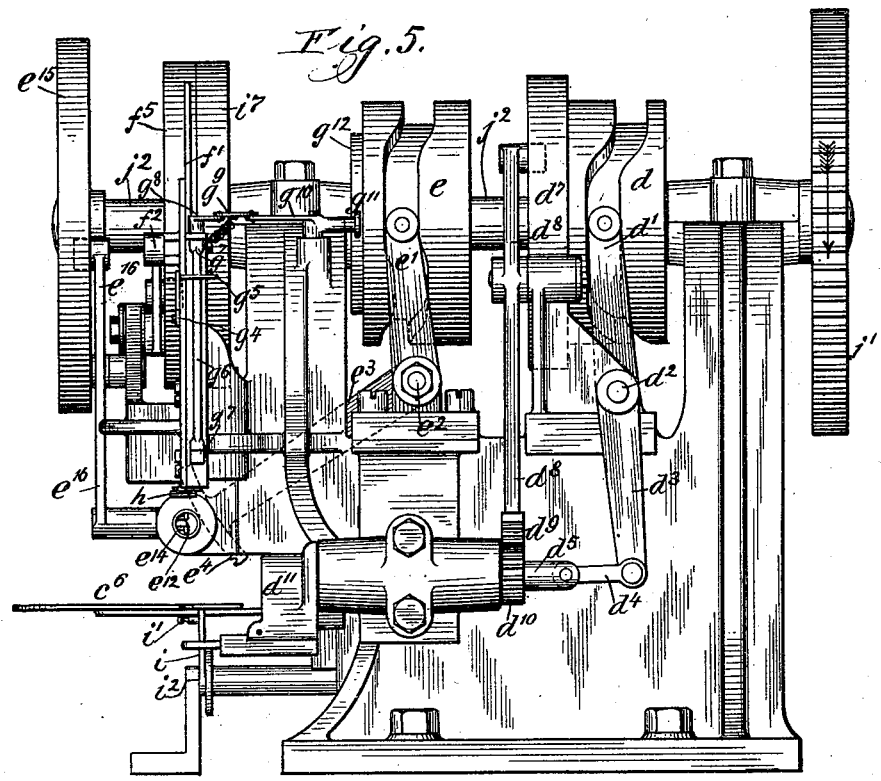
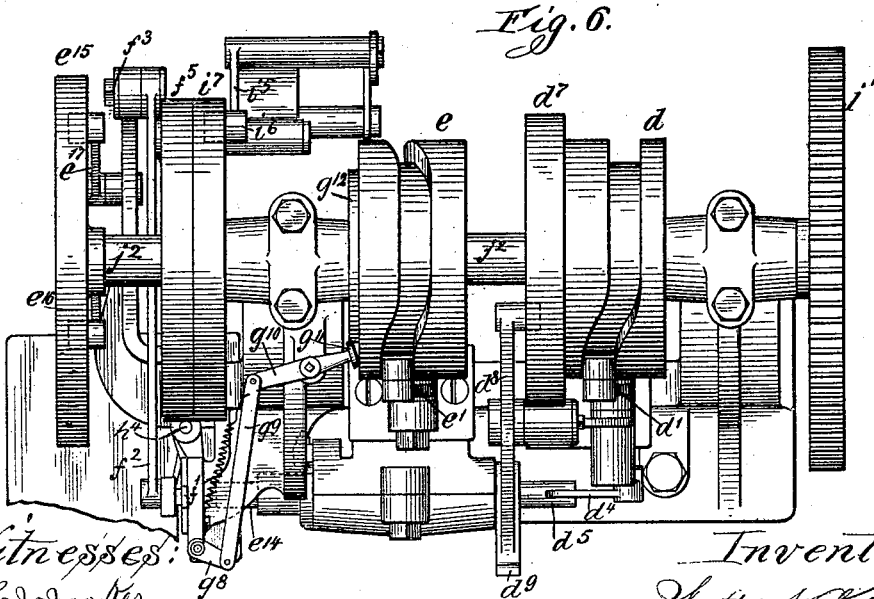

No. 645,567. Patented Mar. 20, 1900.
W. S. McKINNEY.
MACHINE FOR MAKING AND STRINGING TAGS.
(Application filed Apr. 7, 1899.)
(No Model.) 9 Sheets—Sheet 4.

Witnesses:
R. J. Jacker
Charles H. Taylor

Inventor:
Walter S. McKinney
by Roeder & Biesen
Attorney

No. 645,567. Patented Mar. 20, 1900.
W. S. McKINNEY.
MACHINE FOR MAKING AND STRINGING TAGS.
(Application filed Apr. 7, 1899.)
(No Model.) 9 Sheets—Sheet 5.
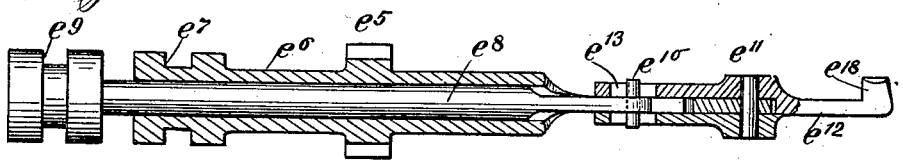
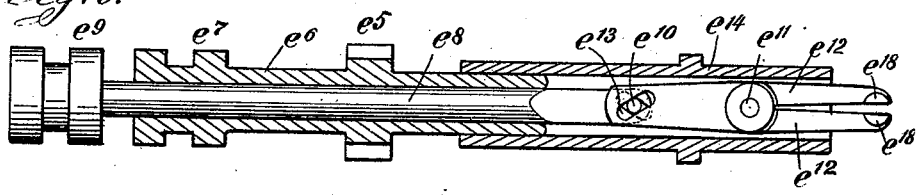
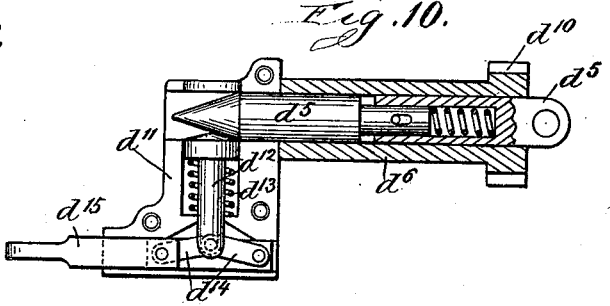
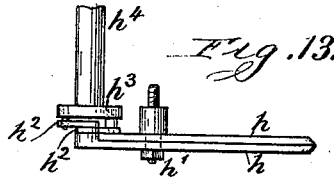
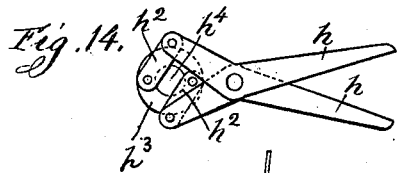
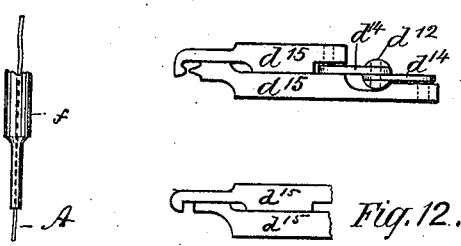
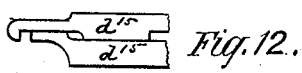
Witnesses:
V. J. Jacker
Charles H. Taylor
Inventor:
Walter S. McKinney
by Roeder & Brien
Attorneys No. 645,567. Patented Mar. 20, 1900.
W. S. McKINNEY.
MACHINE FOR MAKING AND STRINGING TAGS.
(Application filed Apr. 7, 1899.)
(No Model.) 9 Sheets—Sheet 6.
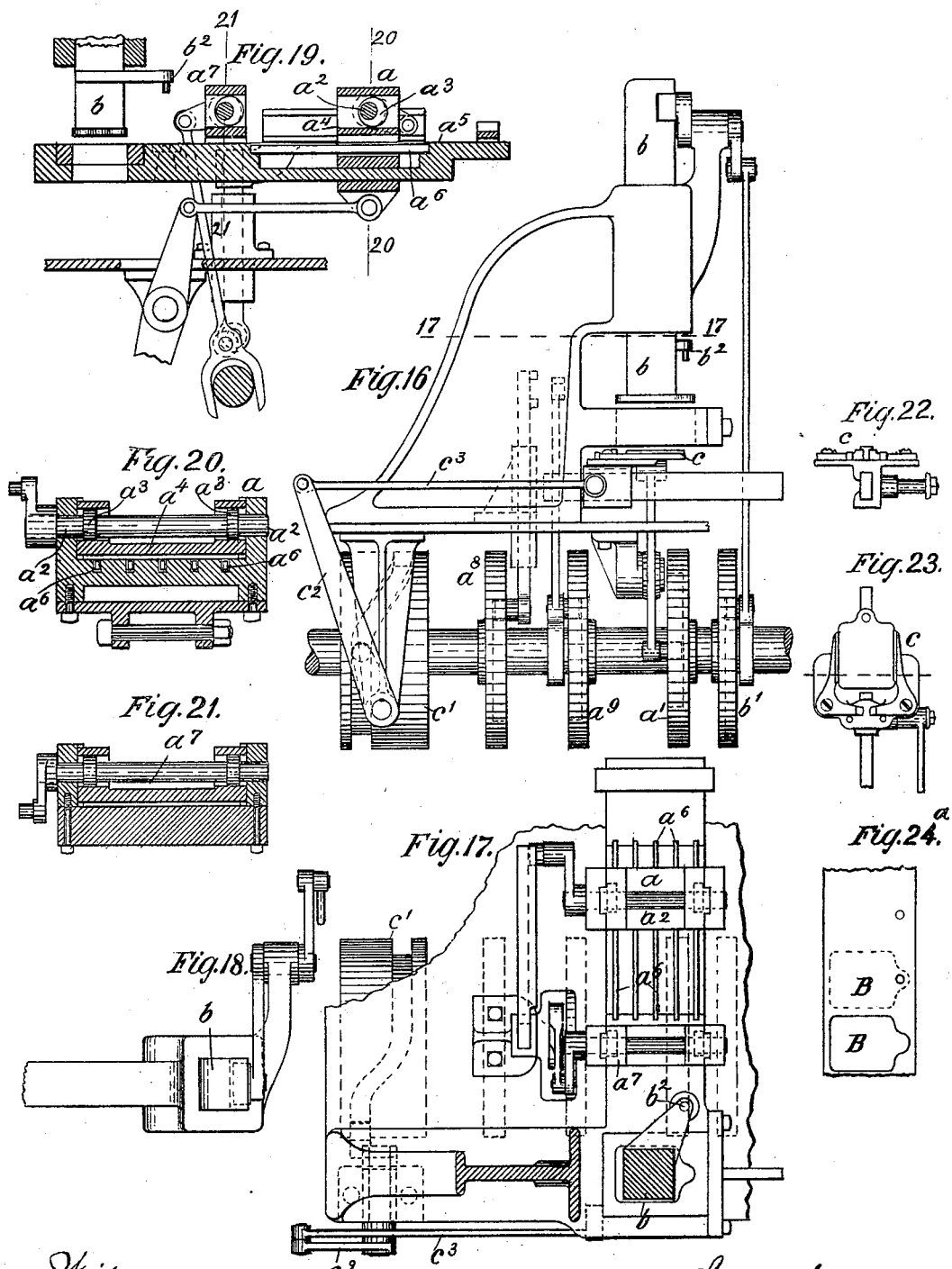

No. 645,567. Patented Mar. 20, 1900.
W. S. McKINNEY.
MACHINE FOR MAKING AND STRINGING TAGS.
(Application filed Apr. 7, 1899.)
(No Model.) 9 Sheets—Sheet 7.
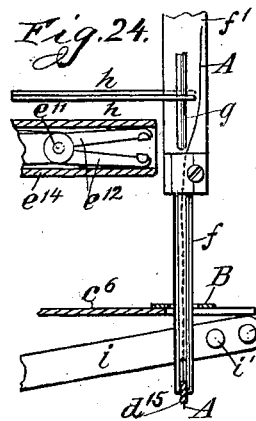
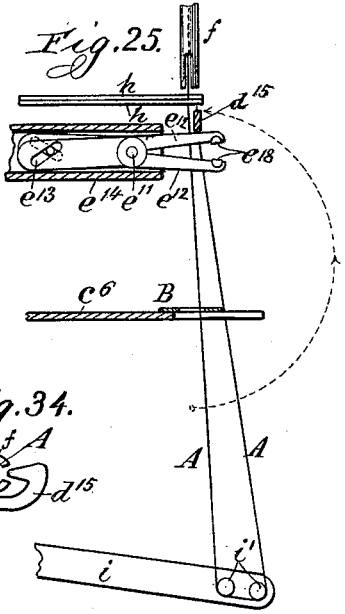
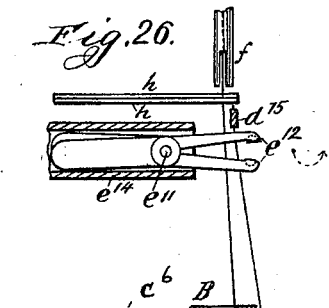
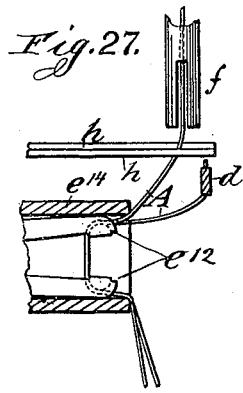
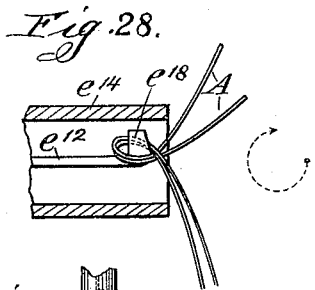
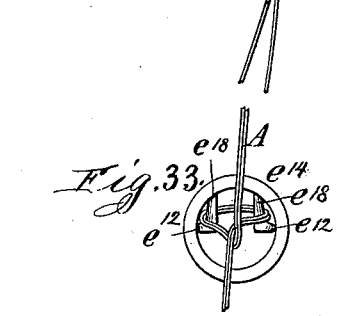
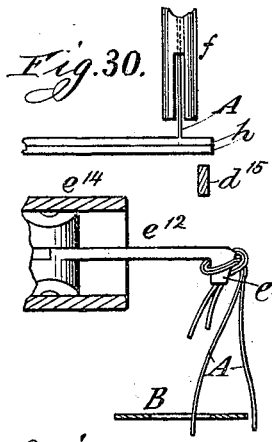
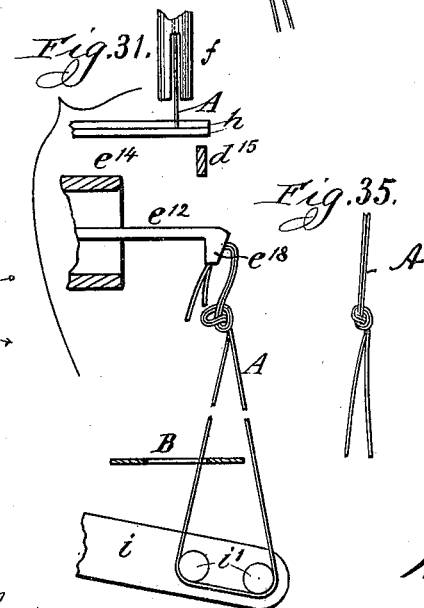
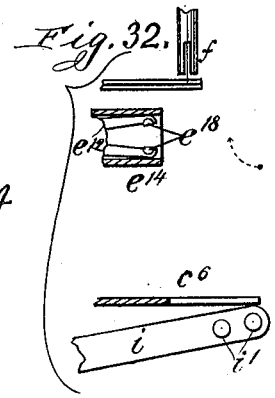
Witnesses:
W. J. Jacker.
Charles H. Taylor.
Inventor:
Walter S. McKinney
by Roeder
Attorney
THE NORRIS PETERS CO., PHOTO-LITHO., WASHINGTON, D. C.

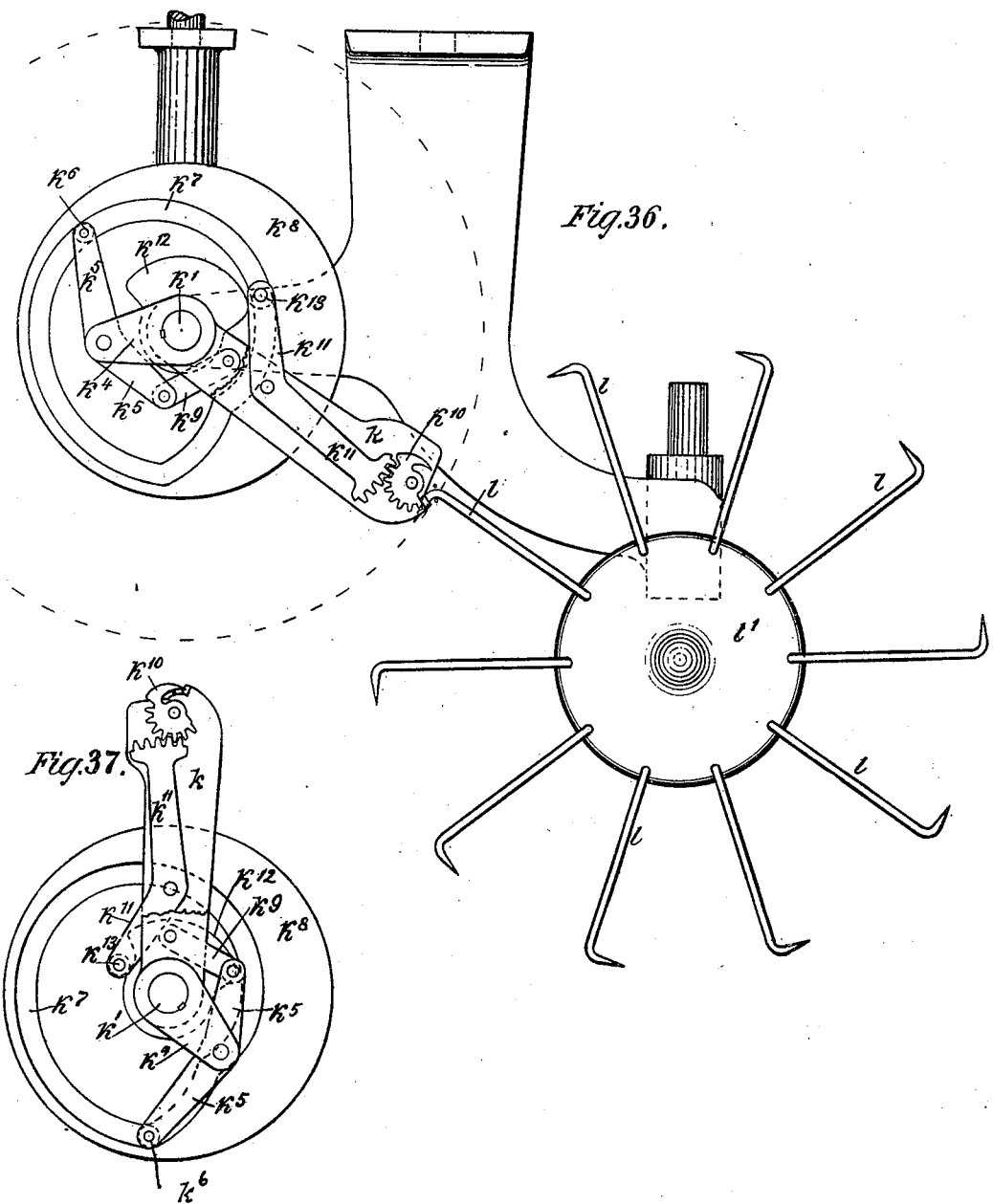

No. 645,567. Patented Mar. 20, 1900.
W. S. McKINNEY.
MACHINE FOR MAKING AND STRINGING TAGS.
(Application filed Apr. 7, 1899.)
(No Model.) 9 Sheets—Sheet 9.
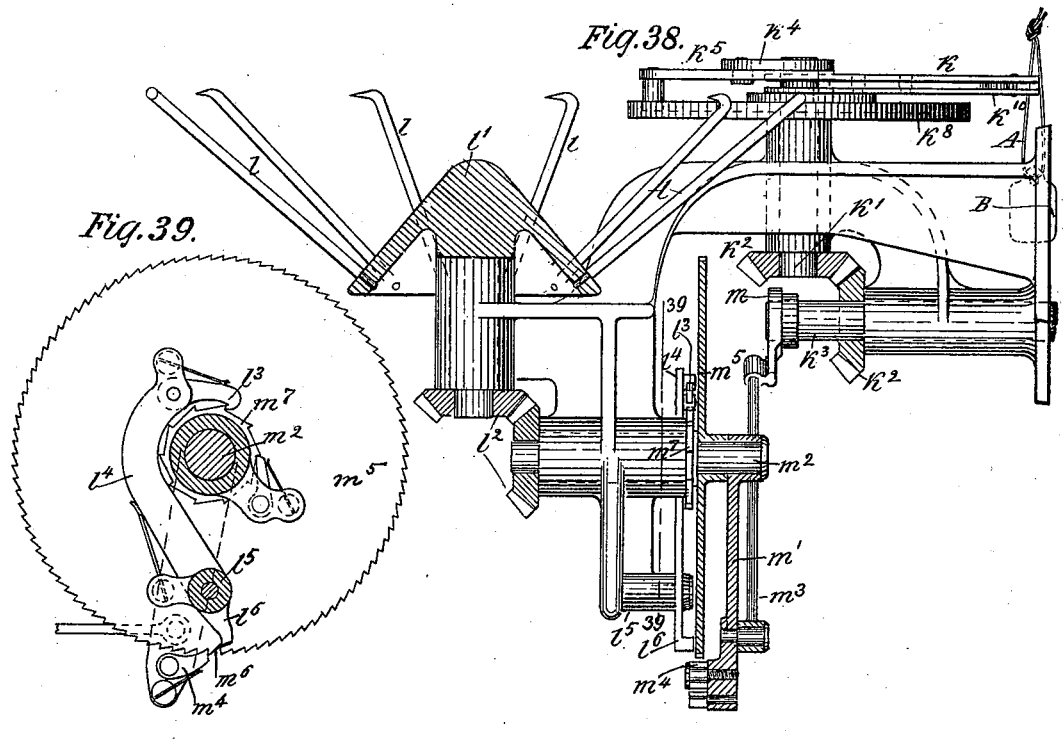
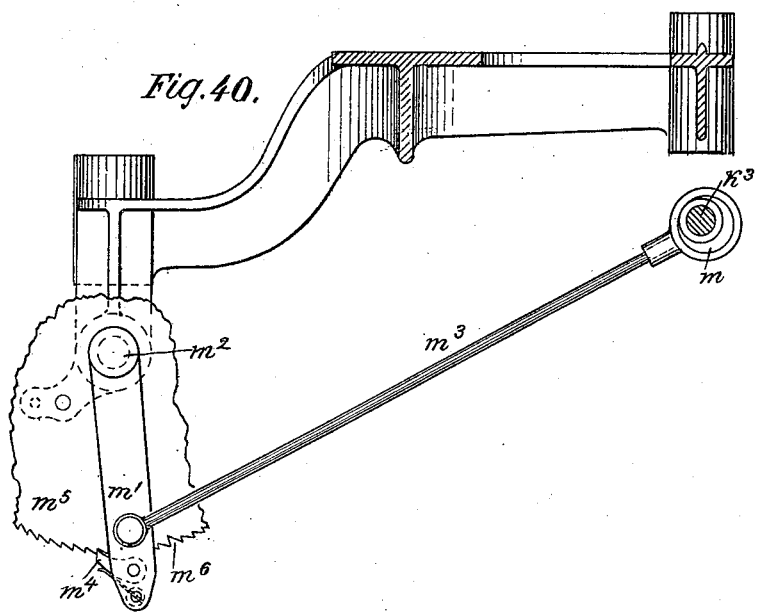
Witnesses:
Charles H. Taylor
William M. Robertson
Inventor
Walter S. McKinney
By Roeder & Briesen
Attorneys

UNITED STATES PATENT OFFICE.

WALTER S. McKINNEY, OF CHICAGO, ILLINOIS, ASSIGNOR TO JOSEPH T. KAVENAUGH, OF PHILADELPHIA, PENNSYLVANIA.

MACHINE FOR MAKING AND STRINGING TAGS.

SPECIFICATION forming part of Letters Patent No. 645,567, dated March 20, 1900.

Application filed April 7, 1899. Serial No. 712,144. (No model.)

*To all whom it may concern:*

Be it known that I, WALTER S. MCKINNEY, a citizen of the United States, and a resident of Chicago, Illinois, have invented certain new and useful Improvements in Machines for Making and Stringing Tags, of which the following is a specification.

This invention relates to a machine for manufacturing what are commonly known as "merchandise tags," such tags being composed of a tag proper and of an attaching-string, which is drawn through the tag and knotted at the ends to form a continuous suspending-loop. A strip of paper and a string are supplied to the machine, and the completed tags properly punched, stringed, and counted are delivered in a rapid and perfect manner.

Briefly stated, the machine operates as follows: Intermittent feed being imparted to the paper strip, the tags are punched and perforated by a die. They are then conveyed underneath a string-containing tube or needle, which is made to pass through the eye of the tag. The lower or free end of the string is grasped by the jaws of a gripper, to which a semicircular upward and downward motion can be imparted. The gripper lays the string around the pins of a lever and then ascends while the lever descends, so that a long loop is drawn out or, in other words, the string is doubled. The gripper places the end of the string next to its body beneath the needle, a knot-former knots or unites the ends of the string to form a continuous loop, and then the string is severed. This loop is grasped by a stripper, which hangs the finished tag upon the finger of a collecting-wheel, which is intermittently rotated by being connected to a suitable counting mechanism. Thus each finger will receive a like number of tags, which are counted and may be removed by the attendant. Of course the tags may also be printed by the machine, preferably before they are punched out.

Figure 1:
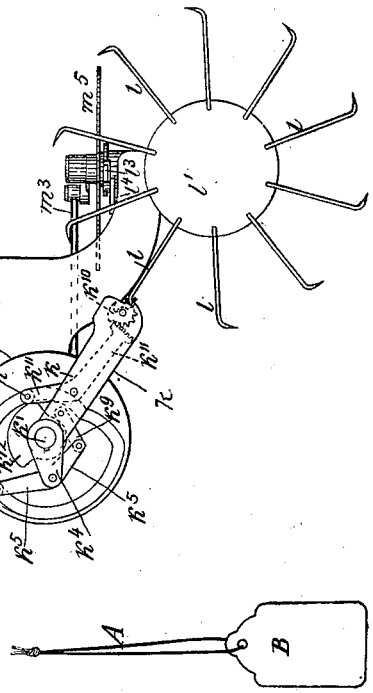
Figure 3:
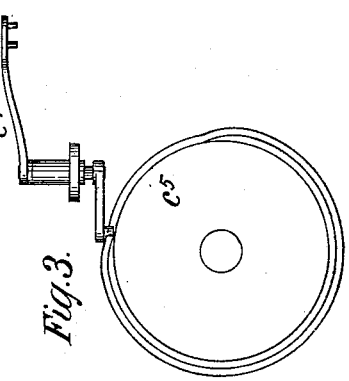
Figure 7:
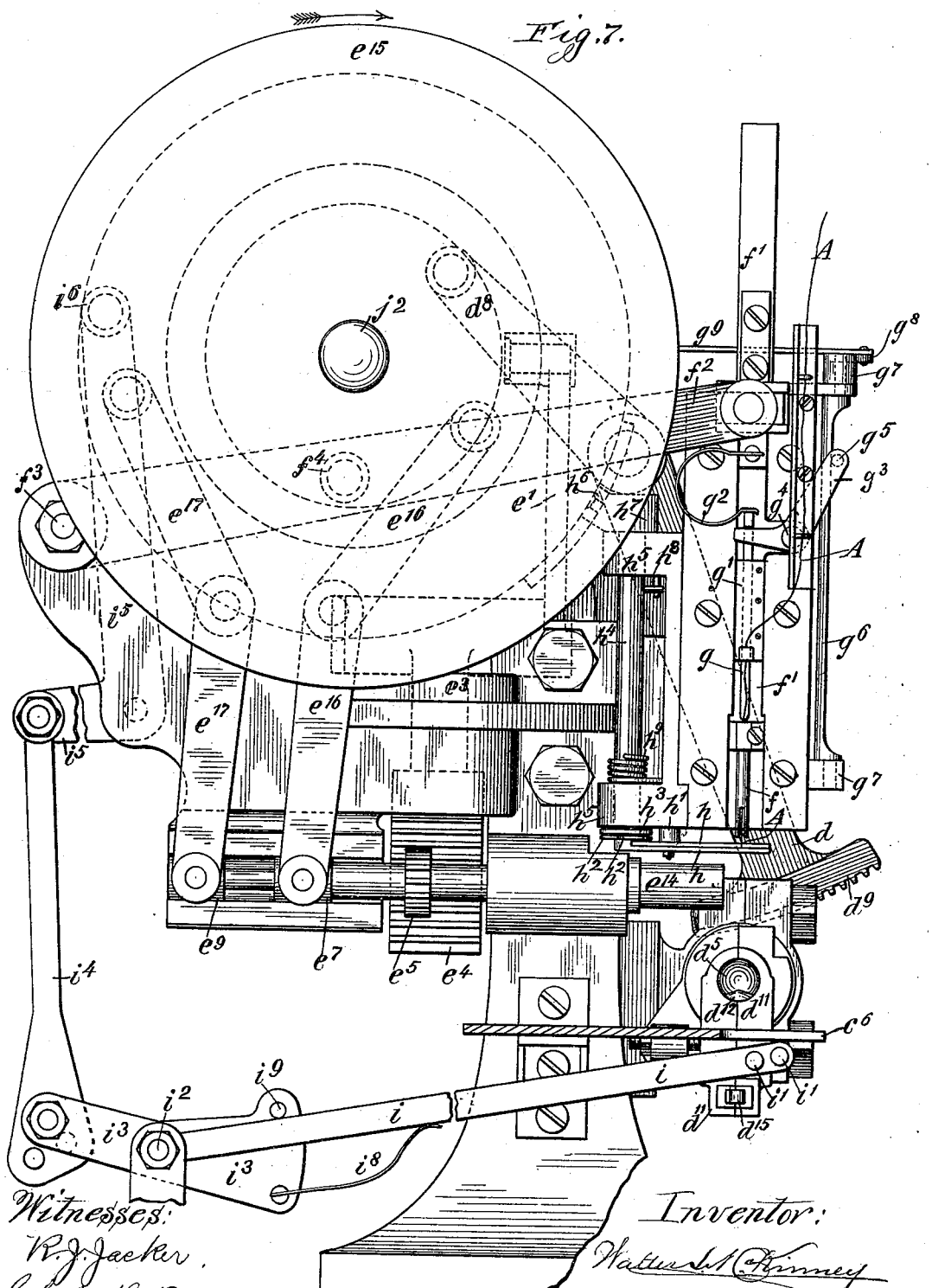

In the accompanying drawings, Figure 1 illustrates the tag made by the machine. Fig. 2 is a plan of the machine; Fig. 3, a detail of the cam and lever for opening the tag-carrier; Fig. 4, a side elevation of the machine; Fig. 5, a side elevation of part of the machine, showing the operating-cams; Fig. 6, a plan thereof; Fig. 7, an enlarged end view of the upper part of the machine looking in the direction of the arrow 7, Fig. 4. Figs. 8 and 9 are longitudinal sections of the knot-former, taken at right angles to each other, the tube $e^{14}$ being omitted in Fig. 8; Fig. 10, a longitudinal section of the gripper; Fig. 11, a detail of the gripping-jaws; Fig. 12, a similar view of a modification; Fig. 13, a side view of the shears; Fig. 14, a bottom view thereof; Fig. 15, a modification of the needle $f$, showing it adapted for thinner work; Fig. 16, a detail side view of the paper-feed and punch; Fig. 17, a horizontal section on line 17 17, Fig. 16; Fig. 18, a plan of the top of the punch; Fig. 19, a longitudinal section of the paper-feeding mechanism; Fig. 20, a cross-section on line 20 20, Fig. 19; Fig. 21, a cross-section on line 21 21, Fig. 19; Fig. 22, an end view of the tag-carrier; Fig. 23, a plan thereof; Fig. 24$^a$, a detail of a paper strip, showing how the tags are punched and perforated. Figs. 24 to 32 are sectional side views of the stringing mechanism, showing it in consecutive positions; Fig. 33, an end view of Fig. 28; Fig. 34, a plan of the gripper, showing its coöperation with the needle; Fig. 35, a detail of the knot made by the machine; Fig. 36, a plan of the stripper and collecting-wheel with the top plate of the stripper removed; Fig. 37, a similar view of the stripper, showing it in a different position; Fig. 38, a side elevation, partly in section, of the stripper, collecting-wheel, and counting mechanism; Fig. 39, a section on line 39 39, Fig. 38; and Fig. 40, a detail of part of the counting-wheel and operating mechanism.

The paper is intermittently fed from a reel to the punching-die by the mechanism illustrated in Fig. 2 and also in Figs. 16 to 21. Here the letter $a$ represents a grooved slide, to which reciprocating motion is imparted by a cam $a'$ in such a manner, preferably, that the length of stroke may be adjusted. In the slide is supported a rock-shaft $a^2$, carrying eccentrics $a^3$, which engage a vertically-movable gripping-bar $a^4$. The slide moves along a table $a^5$, provided with a series of slats or bars $a^6$, corresponding to the grooves of the slide. A forward motion of the slide when the grip is closed carries the paper forward one step equal to the width of a tag, after which the gripper $a^4$ holds the paper until the latter is engaged by a second gripper $a^7$, when the first gripper releases the blank and is returned to its first position, the paper being thus prevented from becoming displaced by the backward movement of the slide. The feed can be made adjustable as to stroke; but in the drawings the adjustable feature is omitted for the sake of simplicity. In Fig. 16 the cams for operating the grippers are represented, cam $a'$ moving the slide, cam $a^8$ the shaft $a^2$, and cam $a^9$ the gripper $a^7$. The paper is fed in the manner described to the punch $b$, Figs. 16, 17, and 18, which punches out a tag of the desired contour, Fig. 24$^a$, and is operated from cam $b'$. The punch $b$ is provided with a secondary punch $b^2$, which forms a string hole or eye in the blank B, Fig. 24$^a$, for the tag next to be severed. The punch $b$ is placed vertically above a horizontally-movable carrier $c$, Figs. 22 and 23, composed of a pair of spring-jaws and between which the tag is seated by the movement of the punch. This carrier is horizontally movable and adapted to convey the tag from the punch to the stringing mechanism, so that its eye is brought into alinement vertically with the needle. The drawings show a single reciprocating carrier moved from cam $c'$ by lever $c^2$ and rod $c^3$; but, if desired, a revolving carrier may be used having a number of jaws and moved intermittently, so as to present the successive tags to the needle. When the carrier has placed its tag underneath the needle upon a table $c^6$, it is opened by a lever $c^4$, Fig. 3, actuated by cam $c^5$, so as to release the tag.

The mechanism for stringing the tags consists, essentially, of five parts, viz: first, the vertically-movable thread-tube or needle, which passes the string through the tag; second, the gripper which engages the free end of the string and doubles the thread upon itself; third, a vertically-movable lever around which the string is drawn by the gripper; fourth, shears for severing the string, and, fifth, a knot-former which ties the ends of the string into a knot. In Figs. 5, 6, and 7 the cams and levers which operate these parts are more fully represented. The cylinder-cam $d$, by lever $d'$, rock-shaft $d^2$, and lever $d^3$, operates the jaws of the gripper. The lever $d^3$ is, by link $d^4$, connected to a plug $d^5$, which is longitudinally movable within a rotatable sleeve $d^6$. To this sleeve motion is imparted from cam $d^7$ by lever $d^8$, having a rack-segment $d^9$, that engages a pinion $d^{10}$ of the sleeve. The sleeve $d^6$ is adapted to rock or make about a one-half rotation to and fro in its bearing and is provided with a lateral extension $d^{11}$, so that the entire sleeve is L-shaped and that the free end of the extension $d^{11}$ sweeps through a semicircle. Within the extension $d^{11}$ is contained a pin $d^{12}$, having a conical head and held against the conical head of plug $d^5$ by a spring $d^{13}$. To the end of the pin $d^{12}$ are pivoted a pair of links $d^{14}$, that operate the jaws $d^{15}$ of the gripper, such jaws being adapted to grasp the string. Figs. 11 and 12 show two different forms of gripping-jaws.

The plug $d^5$ is made sectional, as shown in Fig. 10, being composed of a tapering head, having a reduced shank, which is received by a sleeve containing a spring. The two parts of the plug are united by a pin-and-slot connection, as shown, the object of this construction being to prevent jamming of the jaws $d^{15}$ when the plug is forced against the pin $d^{12}$. It will be seen that when the plug $d^5$ impinges against pin $d^{12}$ the jaws $d^{15}$ are closed, and when the plug recedes the jaws are opened by the spring $d^{13}$.

The mechanism for operating the knot-forming device is as follows: The cam $e$, Figs. 5 and 6, rotates by lever $e'$, rock-shaft $e^2$, and arm $e^3$, having rack $e^4$, a pinion $e^5$, Figs. 8 and 9, formed upon a hollow shaft $e^6$. This shaft is provided with a grooved collar $e^7$ at one end and is flattened at its other end, the bore of the shaft extending nearly to the end of its flattened portion. Within the bore of the hollow shaft $e^6$ is contained a plug or shaft $e^8$, having at its free end a grooved collar $e^9$, while its opposite end is flattened and provided with a pin $e^{10}$.

To the flattened end of the shaft $e^6$ are pivoted at $e^{11}$ the two jaws $e^{12}$ of the knot-former, having hook-shaped ends $e^{18}$. These jaws are provided with oblique slots $e^{13}$, which are engaged by the pin $e^{10}$. The jaws $e^{12}$ are adapted to move into and out of and to rotate together with a tube $e^{14}$, Fig. 9, which tube is made rotatable together with the jaws for the purpose of not cutting the string while the latter is wound around the jaws.

The collars $e^7 e^9$ serve to impart longitudinal motion to the shafts $e^6 e^8$ by levers $e^{16} e^{17}$, actuated by double cam $e^{15}$, Fig. 6. It will be seen that the movement of the levers $e^{16} e^{17}$ will move the shafts $e^6 e^8$ forward and backward into and out of tube $e^{14}$, while the rack $e^4$ will oscillate said shafts.

$f$ is a tubular thread-guide or "needle" which is secured to a vertically-movable slide or needle-bar $f'$, actuated by lever $f^2$, pivoted at $f^3$, and having roller $f^4$, engaging cam $f^5$. The string A is threaded through the tube $f$ and may be clamped intermittently at the upper end thereof by means of a vertically-movable plug $g$. This plug is guided by a grooved plate $g'$, fastened to the needle-bar, and is normally pressed by a spring $g^2$ into the upper countersunk end of the needle $f$. The plug $g$ is engaged by a bell-crank $g^3$, turning on pivot $g^4$, and having pin $g^5$, which projects across the face of a flattened rock-shaft $g^6$, supported in bearings $g^7$. The shaft is rocked by crank $g^8$, spring-actuated link $g^9$, and lever $g^{10}$, having roller $g^{11}$, which engages cam $g^{12}$. The outward movement of the roller $g^{11}$ will bring the edge of the shaft $g^6$ against the pin $g^5$ and will thus raise the plug $g$ off the needle $f$ to liberate the string. The inward movement of the roller $g^{11}$ will rock the shaft $g^6$ at right angles to bring its flattened face against the pin $g^5$, and thus the plug $g$ will, by spring $g^2$, be pressed upon the needle to lock the string.

Beneath the needle (when in its uppermost position) are pivoted at $h'$ to the machine-frame a pair of shear-blades $h$. The shanks of these blades are, by pivoted links $h^2$, connected to the collar $h^3$ of an upright rock-shaft $h^4$, which turns in bearings $h^5$. The shaft $h^4$ is actuated from a swelling on cam $f^5$ by roller $h^6$ and lever $h^7$, so that the rocking motion of the shaft will open and close the shear-blades. To normally hold the shear-blades in their open position, the shaft $h^4$ is, by spring $h^9$, held against a pair of stop-pins $h^8$.

$i$ represents the lever for drawing out the loop and which has one or more pins $i'$, sidewise of the needle $f$. The lever $i$ is pivoted at $i^2$ to a two-armed lever $i^3$, which is actuated by link $i^4$, bell-crank $i^5$, and roller $i^6$ from $i^7$. The lever $i$ is yieldingly held against a stop-pin $i^9$ of lever $i^3$ by spring $i^8$.

Motion being imparted from the main driving-shaft $j$ by wheels $j'$ to counter-shaft $j^2$, carrying the various cams $d$, $d^7$, $e$, $g^{12}$, $i^7$, $f^5$, and $e^{15}$, the operation of the stringing mechanism is as follows: The needle $f$, through which the string A is threaded, descends through the eye of the tag B, the exposed end of the string is grasped by the jaws $d^{15}$ of the gripper, Fig. 24, the plug $g$ is raised, and the needle $f$ is raised above the shears. The gripper swings upward to lay the string around the pins $i'$ of lever $i$, making a half-revolution, (dotted lines, Fig. 25,) and the lever $i$ is moved downward, so that the string A is drawn out into a loop of the desired length. The end of the string is, by the gripper, brought close to the body of the string above the shears, and the plug $g$ is lowered to clamp the string to the needle. The knotting-jaws $e^{12}$, which during this operation have been advanced across the doubled string and opened, with the hooks $e^{18}$ pointing away from the string, now make a half-rotation to place the hooks across the string, Fig. 26. The jaws $e^{12}$ recede to draw the string into the tube $e^{11}$, Fig. 27, and make, together with the tube, a three-quarter turn, so as to lay or loop the doubled string once around them, Fig. 28, the lever $i$ moving sufficiently upward to compensate for the amount of string drawn in. The jaws advance outward open and when out full close tightly upon the doubled string above the loop, Fig. 29. As soon as the jaws have closed upon the string the gripper releases its hold and moves sidewise, and the shears cut off the string. The jaws $e^{12}$ revolve one-half turn, so that their hooks, clamping the string ends, point downward, Fig. 30. The lever $i$ is given a decided jerk downward and pulls the loop off the hook $e^{18}$, thereby forming a tight knot, Figs. 31 and 35. When the operation is completed, the jaws will open and recede into the tube, Fig. 32.

Before the stringed tag is pulled off the knotting-jaws the doubled string is engaged by a take-off device or stripper, which carries the tag to the collecting-wheel. This stripper is illustrated in Figs. 2, 4, and 36 to 38. It consists of one or more arms $k$, revolved by shaft $k'$ and bevel-gear $k^2$ from shaft $k^3$, as follows: The shaft $k'$ has a crank-arm $k^4$, to which is pivoted a lever $k^5$, having a roller $k^6$ running in groove $k^7$ of stationary cam $k^8$. The lever $k^5$ is, by link $k^9$, connected to arm $k$, so that an irregular motion is imparted to the latter. To the end of arm $k$ is pivoted a claw or hook $k^{10}$, provided with gear-segment engaged by a rack formed on the end of a lever $k^{11}$, pivoted to arm $k$. A second cam or cam-surface $k^{12}$, engaging roller $k^{13}$ on lever $k^{11}$, reciprocates such lever to alternately project and retract the hook $k^{10}$.

The operation is as follows: When the knot is about finished and the string is still suspended from the knot-former, the hook enters between the doubled string and closes upon the same. At this stage the arm $k$ dwells to prevent the string from being torn off the hook, and then the arm resumes its rotary motion until brought opposite one of the pins $l$ of the collecting-wheel $l'$. Here the hook $k^{10}$ opens to release the tag and string it upon a pin $l$, Fig. 4. The pins $l$ project upwardly from a hub or wheel $l'$, which is controlled by a counting device, so that when, say, one hundred tags have been strung upon one pin $l$ the wheel advances one space to bring its next pin into the proper position for receiving another set of tags. In this way the tags assembled in uniform numbers may be removed from the machine by the attendant.

The counting mechanism is as follows: Upon the shaft $k^3$ is mounted an eccentric $m$, which oscillates a lever $m'$ around shaft $m^2$ by link $m^3$. The lever $m'$ carries pawl $m^4$, which engages and turns a ratchet-wheel $m^5$, having, preferably, one hundred teeth, one of which, $m^6$, is deepened. The shaft $m^2$ carries a ratchet-wheel $m^7$ and drives the wheel $l'$ by bevel-gear $l^2$. The wheel $m^7$ has, preferably, ten teeth and is engaged by a pawl $l^3$, carried by a spring-actuated two-armed lever $l^4$, pivoted to the frame at $l^5$. The pawl $m^4$ clears the arm $l^6$ of lever $l^4$ during the passage of the ninety-nine normal teeth, but upon the passage of the tooth $m^6$ the pawl $m^4$ drops farther inward and engages the lever-arm $l^6$, so as to advance the wheel $m^7$ one space and to consequently bring another pin $l$ into alinement with the stripper.

What I claim is—

1. In a tag-machine, the combination of a reciprocating needle, with an oscillating gripper adapted to engage the string, a lever around which the string is looped by the gripper, means for bodily moving the gripper-jaws to draw out the string and elongate the loop, and means for moving the lever toward and away from the needle, substantially as specified.

2. In a tag-machine, the combination of a reciprocating hollow needle, with a plug for intermittently clamping the string to the needle, an oscillating gripper adapted to engage the string, a lever around which the string is looped by the gripper, means for moving the lever toward and away from the needle, means for cutting the string, and a knot-former for knotting the ends of the string, substantially as specified.

3. In a tag-machine, a gripper composed of an L-shaped sleeve, a pair of jaws, a longitudinally-movable plug within the sleeve, and means for converting the reciprocating motion of the plug into an opening and closing motion of the jaws, substantially as specified.

4. In a tag-machine, the combination of a rotatable sleeve with a sectional spring-plug having a conical head, a pin engaged by the plug, and a pair of jaws operatively connected to the pin, substantially as specified.

5. In a tag-machine, a knot-former composed of a tubular shaft, an inclosed longitudinally-movable and oscillating plug, a pair of jaws pivoted thereto and having hook-shaped ends, and a rotatable tube into and out of which the jaws are adapted to be projected, substantially as specified.

6. In a tag-machine, a knot-former composed of a tubular shaft, an inclosed longitudinally-movable and oscillating plug, a pair of jaws having oblique slots and hook-shaped ends, a pin engaging the oblique slots, and a rotatable tube into and out of which the jaws are adapted to be projected, substantially as specified.

7. In a tag-machine, a knot-former composed of a tubular sleeve, an inclosed longitudinally-movable and oscillating plug having a flattened end, a pair of jaws having oblique slots and pivoted to said flattened end, and a rotatable tube into and out of which the jaws are adapted to be projected, substantially as specified.

8. In a tag-machine, the combination of a lever $i$, for drawing out the loop, with a lever $i^3$, to which lever $i$, is pivoted, a stop-pin $i^9$, on lever $i^3$, and a spring for yieldingly holding lever $i$, against said pin, substantially as specified.

9. In a tag-machine, a paper-feed composed of a slide, a rock-shaft hung therein, eccentrics mounted upon the rock-shaft, a gripping-bar actuated by the eccentrics, and a second vertically-movable gripper adapted to engage the blank when released by the gripping-bar, substantially as specified.

10. In a tag-machine, the combination of a crank-shaft, with a cam-actuated lever pivoted thereto, a stripper-arm pivoted to the lever, a hook pivoted to the stripper-arm, and means for opening and closing said hook, substantially as specified.

11. In a tag-machine, the combination of a paper-feed, with a punch, a carrier, a tubular needle, a plug for intermittently clamping the string, an oscillating gripper, a lever around which the string is looped by the gripper, means for bodily moving the gripper-jaws to draw out the string and elongate the loop, means for cutting the string, a knot-former, and a stripper adapted to draw the stringed tag off the knot-former, substantially as specified.

Signed by me at Chicago, Illinois, this 3d day of April, 1899.

WALTER S. McKINNEY.

Witnesses:
WILLIAM IRVIN,
W. H. BADOUX.